(12) United States Patent
Payne

(10) Patent No.: US 8,638,490 B1
(45) Date of Patent: Jan. 28, 2014

(54) SUB-LITHOGRAPHIC DIFFRACTIVE MEMS

(75) Inventor: Alexander P. Payne, Ben Lomond, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 403 days.

(21) Appl. No.: 12/905,352

(22) Filed: Oct. 15, 2010

Related U.S. Application Data

(60) Provisional application No. 61/251,927, filed on Oct. 15, 2009.

(51) Int. Cl.
G02B 26/00 (2006.01)

(52) U.S. Cl.
USPC .......................................... 359/290

(58) Field of Classification Search
USPC .................................. 359/290, 291
See application file for complete search history.

(56) References Cited

U.S. PATENT DOCUMENTS

| | | | |
|---|---|---|---|
| 6,528,372 B2 | 3/2003 | Lukanc et al. | |
| 7,046,420 B1 * | 5/2006 | Hunter et al. | 359/291 |
| 7,064,883 B2 | 6/2006 | Payne et al. | |
| 2005/0237743 A1 * | 10/2005 | Payne et al. | 362/271 |
| 2009/0179286 A1 * | 7/2009 | Schoen et al. | 257/415 |

* cited by examiner

Primary Examiner — James Jones
(74) Attorney, Agent, or Firm — William Nuttle

(57) ABSTRACT

A diffractive MicroElectroMechanical systems and a method of fabricating the same are provided. In one embodiment, the method comprises: depositing a sacrificial layer onto a substrate; depositing a first structural layer on the sacrificial layer and patterning the structural layer to form a patterned structural layer including plurality of actuators; conformably depositing a sacrificial film on the patterned structural layer; depositing a second structural layer on the sacrificial film; planarizing the second structural layer to expose the sacrificial film and the plurality of actuators; and removing the sacrificial layer and sacrificial film to release the plurality of actuators, each of the plurality of actuators separated from the second structural layer by a thickness of the conformal sacrificial film. Other embodiments are also provided.

19 Claims, 11 Drawing Sheets

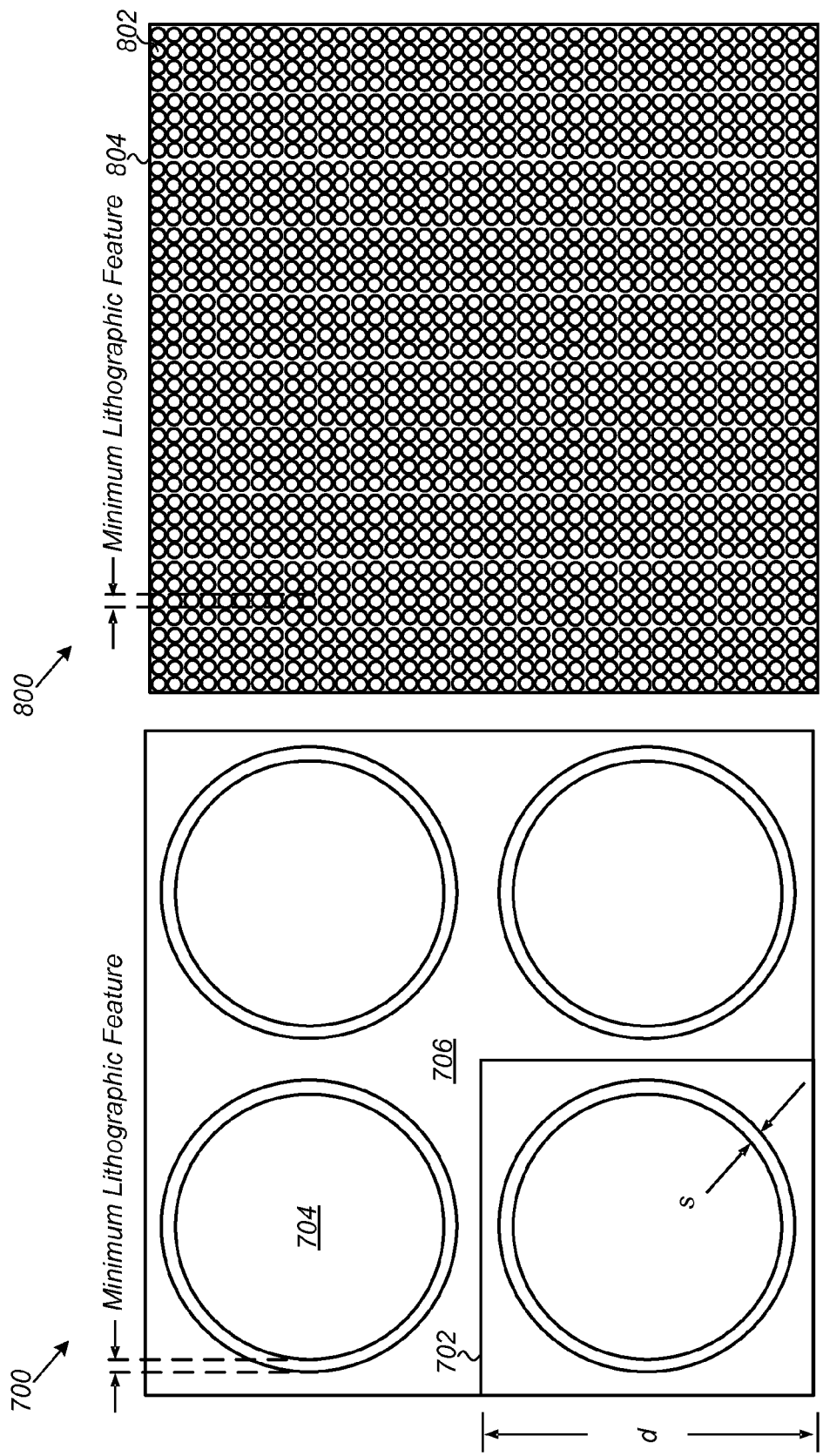

US 8,638,490 B1

SUB-LITHOGRAPHIC DIFFRACTIVE MEMS

CROSS-REFERENCE TO RELATED APPLICATIONS

The present application claims the benefit of priority under 35 U.S.C. 119(e) to U.S. Provisional Patent Application Ser. No. 61/251,927 entitled "Sub-Lithographic Diffractive MEMS," filed Oct. 15, 2009, which application is hereby incorporated by reference in its entirety.

TECHNICAL FIELD

The present invention relates to a MicroElectroMechanical System (MEMS), and more particularly to a sub-lithographic diffractive MEMS and methods of fabricating the same.

BACKGROUND

Diffractive MicroElectroMechanical Systems or MEMs use electrical signals to move micromechanical structures to control or modulate light incident thereon. The incident light beam can be modulated in intensity, phase, polarization or direction. Diffractive MEMS are increasingly being developed for use in spatial light modulators (SLM) used in various applications, including display systems, optical information processing and data storage, printing, and maskless lithography. One shortcoming of existing diffractive MEMS is a low angular light scattering capability, also referred to as scattering angle. Larger angular swings are desirable to enable a larger solid angle of light to be focused onto the SLM without degrading contrast. Angular swing of conventional diffractive MEMS is typically less than about 4° for visible and UV light.

Scattering angle is a strong function of the pitch or spacing between individual diffraction cells of the SLM. As cell pitch is reduced to approximately five times (5×) a wavelength of the modulated light, the scattering angle rapidly increases. However, due to limitations on a minimum feature size that can be fabricated using conventional lithography, the fill factor or reflective efficiency of the SLM also drops below 50% when as cell pitch approaches five times (5×) the minimum feature size.

SUMMARY

A sub-lithographic diffractive MicroElectroMechanical systems (MEMS) and a method of fabricating the same are provided. In one embodiment, the method comprises: (i) depositing a sacrificial layer onto a substrate; (ii) depositing a first structural layer on the sacrificial layer and patterning the structural layer to form a patterned structural layer including plurality of actuators; (iii) conformably depositing a sacrificial film on the patterned structural layer; depositing a second structural layer on the sacrificial film; (iv) planarizing the second structural layer to expose the sacrificial film and the plurality of actuators; and (v) removing the sacrificial layer and sacrificial film to release the plurality of actuators, each of the plurality of actuators separated from the second structural layer by a thickness of the sacrificial film. Generally, the sacrificial film comprises a thickness of between 100 to 2500 Å, thereby enabling the forming of actuators having a dimension parallel to a plane of the structural layer of less than or equal to 500 micrometers (μm), and a pitch or separation between actuators of also less than or equal to 500 μm.

BRIEF DESCRIPTION OF THE DRAWINGS

These and various other features of the invention will be apparent upon reading of the following detailed description in conjunction with the accompanying drawings and the appended claims provided below, where:

FIG. 7 is a top view of a number of cells of a diffractive MEMS fabricated according to a conventional method;

FIG. 8 is a top view of a number of cells of a diffractive MEMS fabricated according to a method of the present disclosure;

DETAILED DESCRIPTION

The present disclosure is directed to sub-lithographic diffractive MicroElectroMechanical systems (MEMS) and methods of forming or fabricating the same are provided. By sub-lithographic it is meant a structure or feature of the MEMS having at least one dimension smaller than minimum feature size that can be that can be defined by tools used to fabricate the MEMS using conventional lithographic techniques. The method is particularly useful for fabricating a spatial light modulator (SLM) having an array of one or more diffractive MEMS.

Figure 1A:
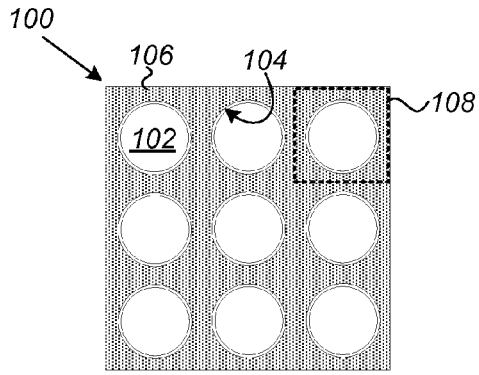
FIG. 1A is a top view of a diffractive MicroElectroMechanical System (MEMS) fabricated according to a method of the present disclosure.
Figure 1B:
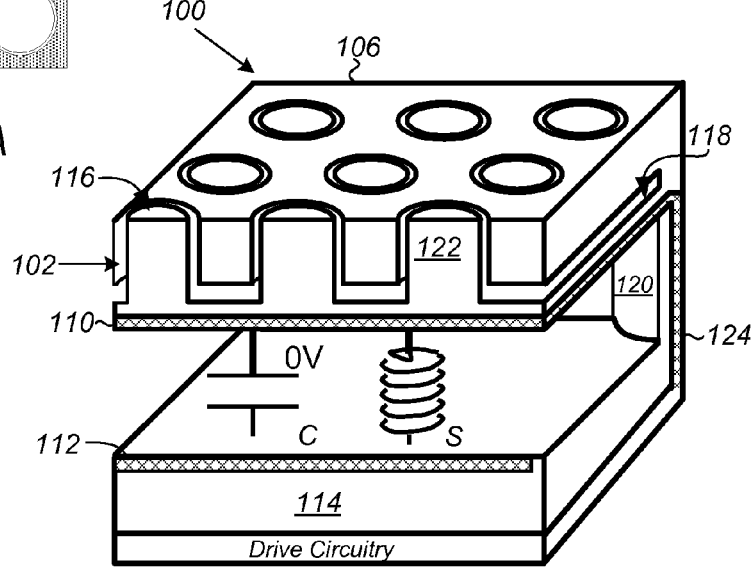
FIG. 1B is a perspective view of a portion of the diffractive MEMS of FIG. 1A in a quiescent state.
Figure 1C:
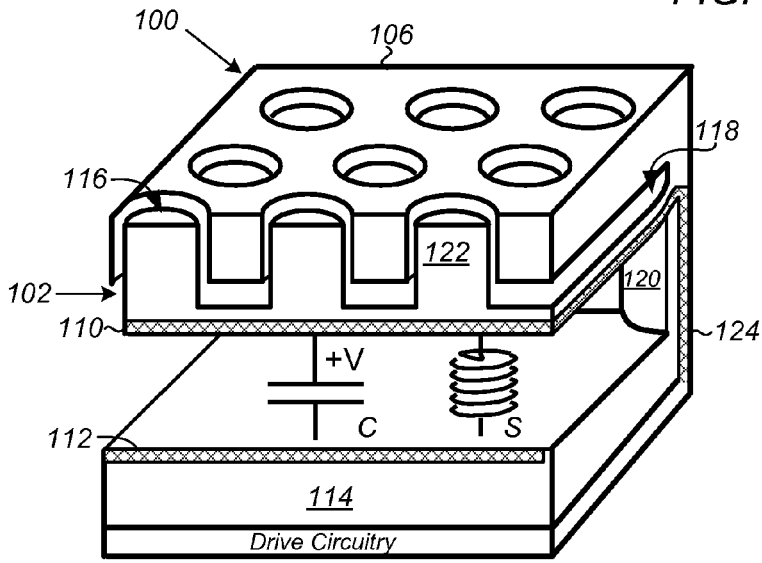
FIG. 1C is a perspective view of a portion of the diffractive MEMS of FIG. 1A in an activated or diffracting state.

Referring to FIGS. 1A through 1C, one such diffractive MEMS is a Planar Light Valve (PLV™) commercially available from Silicon Light Machines, Inc., of Sunnyvale, Calif. FIG. 1A is a top view of a portion of a diffractive MEMS 100 for which a fabrication method according to an embodiment of the present invention is particularly useful.

Referring to FIG. 1A, the MEMS 100 generally includes first and second structural layers having light reflecting surfaces of equal area and reflectivity disposed above the upper surface of a substrate (not shown in this figure). The first structural layer is patterned to form a number of movable pistons or actuators 102 with first reflective surfaces extending or exposed through openings or apertures 104 in a static member or faceplate 106 formed from the second structural layer. An upper surface of the faceplate 106 and exposed surfaces of each of the plurality of actuators 102 are planarized and polished to form optically flat surfaces, covered or coated with a reflective material, such as aluminum. Each of the actuators 102, the associated apertures 104 and a portion of the faceplate 106 immediately adjacent to and enclosing the aperture form a single, individual cell or diffractor 108.

FIG. 1B is a perspective view of the diffractive MEMS 100 in a quiescent state in which the actuators 102 are unmoved relative to the light reflective surface of the static member 106. FIG. 1C is a perspective view of the diffractive MEMS 100 in an activated or diffracting state. Referring to FIGS. 1B and 1C, individual actuators 102 or groups of actuators are moved up or down over a very small distance (typically only a fraction of a wavelength of incident light) relative to the light reflective of the faceplate 106 by electrostatic forces (represented by capacitor C) generated between an actuator electrode 110 and drive electrodes 112 underlying the actuators controlled by drive circuitry in the substrate 114. The actuators 102 can be displaced by $n*\lambda/4$ wavelength, where $\lambda$ is a particular wavelength of light incident on the planar light reflective surfaces, and n is an integer equal to or greater than 0. Moving the actuators 102 brings reflected light from the light reflective surface of the actuators into constructive or destructive interference with light reflected by the light reflective surface of the static member, thereby modulating light incident on the diffractive MEMS 100.

The actuators 102 may include pistons or cylinders each having a planar reflective surface 116 treated or coated with a reflective film and flexibly coupled (represented by spring 5) by hinges or flexures 118 of an elastic material to one or more posts 120 extending from the surface of the substrate 114. For example in the embodiment shown, the actuators 102 comprise pistons formed from a taut silicon-nitride (SiN) layer 122, covered or coated with a thin aluminum film on the reflective surface 116 and flexibly coupled to the posts by narrow flexures 118 formed from the SiN layer. Anchoring posts 120 and flexures 118 may be hidden in the area concealed by the overlying faceplate 106, thereby providing the diffractive MEMS 100 a large étendue (light gathering power) and substantially 100% diffraction efficiency. In addition to the SiN layer 122 and the aluminum film on the reflective surface 116, the actuators include an electrically conductive film or layer, such as a titanium-nitride (TiN) layer, from which the actuator electrode 110 is formed. In some embodiments the electrically conductive layer (actuator electrode 110) is electrically coupled to an electrical potential, such as electrical ground, or the drive electronics through an electrical conductor 124 extending through one or more of the posts 120 so that a voltage applied to the drive electrode 112 electrically deflects actuators toward or away from the substrate.

The diffractive MEMS 100 can include any number of diffractors 108 arranged and operated to form pixels of any configuration or size. A pixel is made up of one or more mechanically coupled actuators or actuators operating under the same (ganged) electrode. Generally, the diffractive MEMS 100 will include an array of from about 1 to about $10^8$ pixels and from 1 to about 25 diffractors 108 per pixel. The embodiment in FIGS. 1A to 1C shows a single pixel configured as a square 3×3 array of diffractors. However it will be apparent to those skilled in the art that the diffractive MEMS 100 can include a number of pixels having any number diffractors arranged in any configuration including square, triangular, hexagonal and circular.

As noted above, the size and position of each of the actuators 102 and apertures 104 are predetermined to satisfy the "equal reflectivity" constraint. That is the reflectivity of the area of a single actuator 102 inside a cell 108 is equal to the reflectivity of the remaining area of the faceplate 106 of the cell that is outside the aperture 104. If the reflectivity of each of the surfaces is the same, then this principle reduces to an "equal area" constraint. As an example of the "equal area" constraint, where the faceplate 106 contains an array of circular apertures 104 in square-shaped cells 108, as shown in FIG. 1A, the area of a circular aperture inside in a unit length square cell is equal to the remaining area (outside circle but inside square), when its diameter, d, is given by the equation: $d=(2/\pi)^{1/2}$ or approximately 0.8 unit length.

The faceplate 106 could be static, anchored or secured to the substrate by a number of posts (not shown) regularly spaced across the diffractive MEMS 100, or freestanding and actuatable, flexibly secured to posts 120 only at a perimeter of the MEMS. In a preferred embodiment, the member 106 is static and periodically secured to the underlying substrate by posts across the diffractive MEMS, for example at each corner of each pixel. More preferably, the faceplate 106 includes an electrically conductive material, such as titanium-nitride (TiN), and is electrically coupled to electrical ground in the substrate through one or more of the posts. Alternatively, if the faceplate 106 is deforming under electrostatic force from the drive electrodes 112 in the substrate 114, it could be electrically floated to eliminate this interaction.

Figure 2:
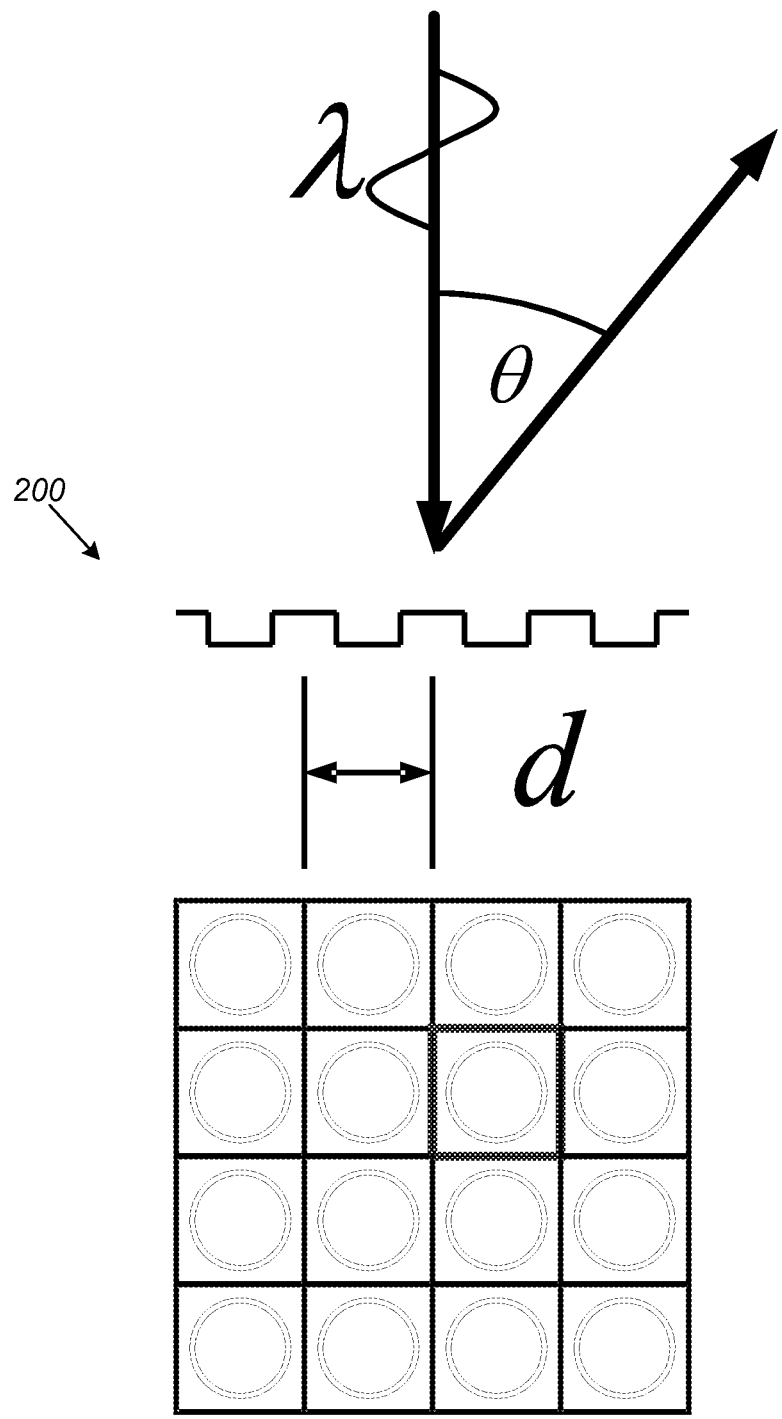
FIG. 2 is a schematic block diagram illustrating the effect of cell pitch on scattering angle for a diffractive MEMS.

Angular swing or scattering angle is a strong function of the diffraction cell pitch or separation between actuators. FIG. 2 is a schematic block diagram illustrating the scattering angle $\theta$ for a diffractive MEMS 200 for incident light having a wavelength $\lambda$. A large scattering angle is desirable to enable a larger solid angle of light to be focused onto the SLM without degrading contrast. Examples of the resulting scattering angles ($\theta$) for a diffractive MEMS 200 having different cell pitches and illuminated with an incident light having a wavelength ($\lambda$) of 543 nanometers (nm) is given in Table I below. Referring to FIG. 2 and Table I below it is noted that as cell pitch in micrometers (μm) approaches 5×$\lambda$ of the incident light or less, $\theta$ rapidly increases.

TABLE I

| Wavelength (λ) 543 nm | Cell Pitch (d) | Scattering Angle (θ) |
|---|---|---|
| 543 nm | 0.60 μm | 64.8° |
| 543 nm | 0.75 μm | 46.4° |
| 543 nm | 1.00 μm | 32.9° |
| 543 nm | 2.00 μm | 15.8° |
| 543 nm | 4.00 μm | 7.8° |
| 543 nm | 8.00 μm | 3.9° |

Figure 3:
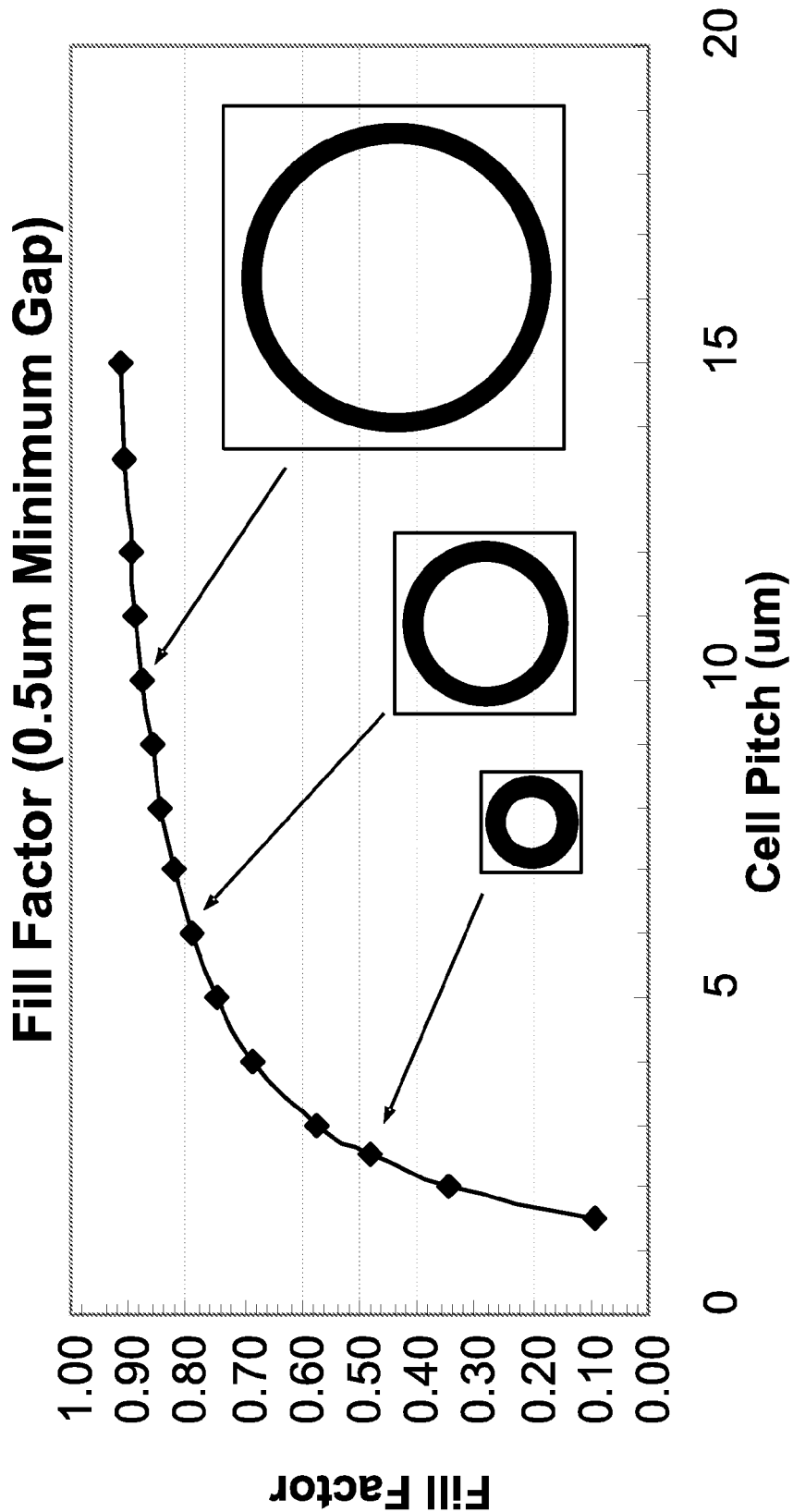
FIG. 3 is a graph illustrating fill factor of a diffractive MEMS as a function of cell pitch.

However, due to a fixed minimum feature size that can be that can be defined by tools used to fabricate the MEMS using conventional lithographic techniques, the reflective efficiency or fill factor also drops. For MEMS fabricated using conventional lithographic techniques it is a gap between the actuators and surrounding faceplate that is limited to the minimum feature size. FIG. 3 is a graph illustrating fill factor of a diffractive MEMS as a function of cell pitch. Referring to FIG. 3, it is noted that for a minimum feature size (gap) of no less than 0.5 μm, fill factor drops below 50% as the cell pitch is reduced to less than about 5× the minimum feature size, i.e., the 0.5 μm gap. Thus, with a 0.5 μm minimum feature size, reflective efficiency or fill factor of diffractive MEMS is very poor for cell pitches below 2 μm.

Figure 4:
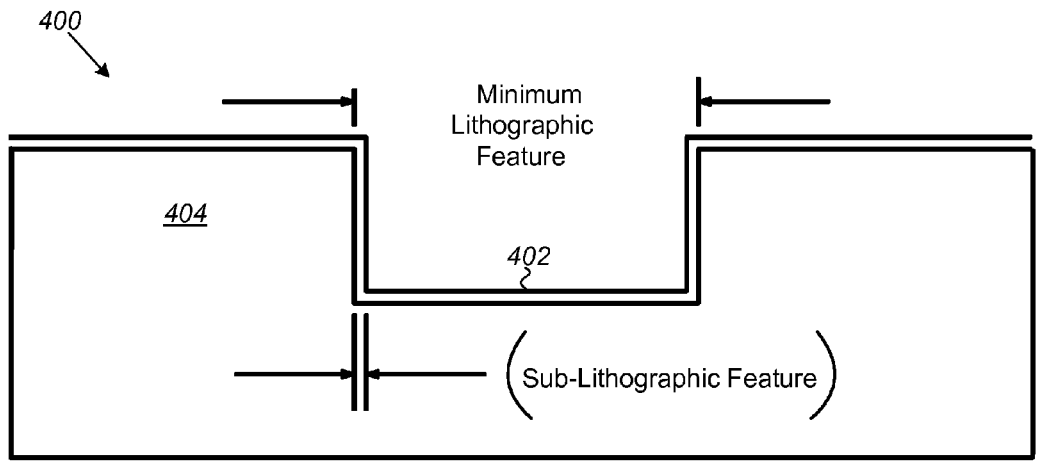
FIG. 4 is a cross-sectional view through a substrate illustrating a minimum lithographic feature as compared to a thickness of a conformal film.

Referring to FIG. 4, in accordance with the present disclosure the diffractive MEMS 400 is fabricated using a conformal sacrificial film 402 deposited or formed on vertical sidewalls of a patterned first structural layer 404 to create sub-lithographic gaps between the actuators and surrounding faceplate. Thicknesses of the sacrificial film 402 can typically be controlled to from 100 to 2500 Å, orders of magnitude thinner than minimal lithographic features. Thus, in the MEMS 400 of FIG. 4 the feature limited to the minimum lithographic feature size, shown here as 0.5 µm, is the size of the actuators or the spacing between the actuators, enabling the fabrication sub-lithographic diffractive MEMS having high fill factors or efficiencies.

Examples of the resulting fill factors for a diffractive MEMS having cell pitches or sizes (d) from 0.25 to 2 µm and fabricated using sacrificial films having a thickness (s) of from 150 to 400 Å is given in Table II below. Referring to FIG. 4 and Table II below it is noted that with 1 µm cell sizes or pitch and reasonable sacrificial film thicknesses, fill factors are >90%.

TABLE II

| Cell Size/Pitch (d) µm | Sacrificial Film(s) Å | Fill Factor |
| --- | --- | --- |
| 0.25 | 150 | 0.850 |
| 0.50 | 150 | 0.925 |
| 0.75 | 150 | 0.950 |
| 1.00 | 150 | 0.962 |
| 2.00 | 150 | 0.981 |
| 0.25 | 200 | 0.799 |
| 0.50 | 200 | 0.900 |
| 0.75 | 200 | 0.933 |
| 1.00 | 200 | 0.950 |
| 2.00 | 200 | 0.975 |
| 0.25 | 400 | 0.599 |
| 0.50 | 400 | 0.799 |
| 0.75 | 400 | 0.866 |
| 1.00 | 400 | 0.900 |
| 2.00 | 400 | 0.950 |

A method of fabricating sub-lithographic diffractive MEMS according to embodiments of the present invention will now be described in greater detail with reference to FIGS. 5A through 5E and FIG. 6. FIGS. 5A-5E are cross-sectional views through a substrate illustrating an embodiment of the fabrication process, and FIG. 6 is a flow chart of the method. For purposes of clarity, many of the details in the fabrication of MEMS in general, which are widely known and are not relevant to the present invention, have been omitted from the following description.

Figure 5A:
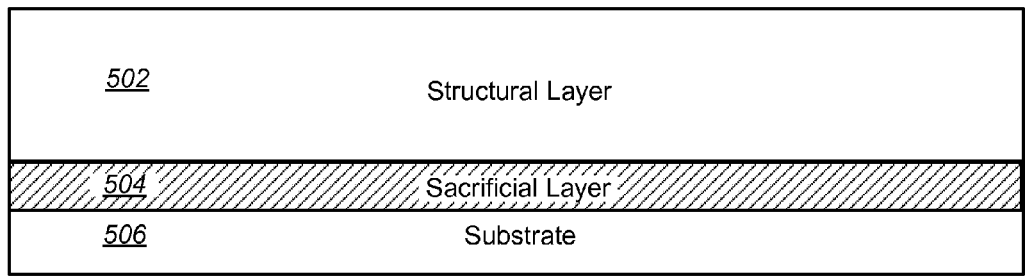
FIGS. 5A-5E are cross-sectional views through a substrate illustrating an embodiment of a fabrication process of a diffractive MEMS according to a method of the present disclosure.
Figure 6:
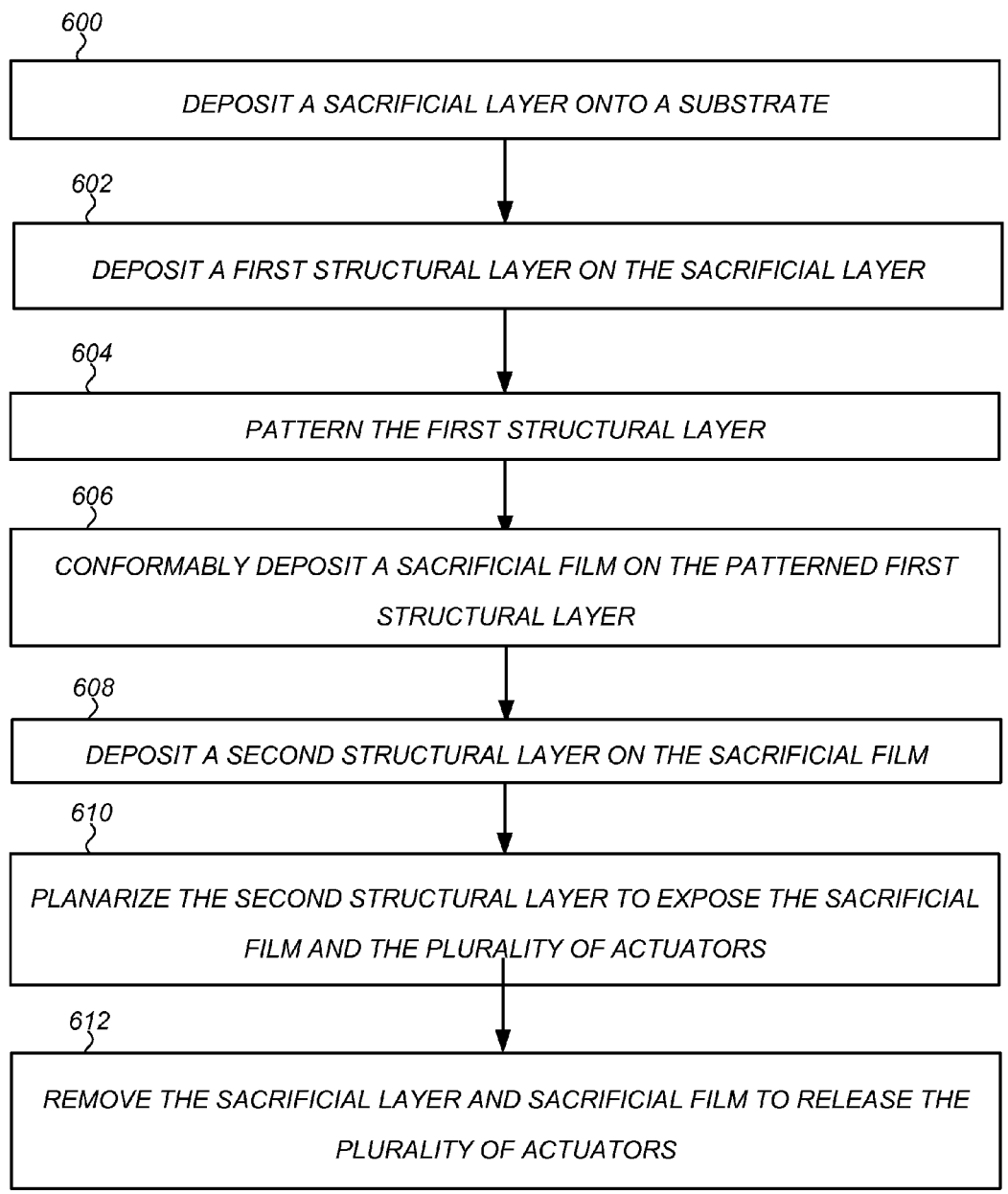
FIG. 6 is a flow chart illustrating an embodiment of a method for fabricating a diffractive MEMS according to the present disclosure.

Referring to FIGS. 5A and 6, the method of fabricating a sub-lithographic diffractive MEMS begins with depositing or forming a sacrificial layer 504 on a surface of a substrate 506 (block 600). Next, a first structural layer 502 is deposited or formed over the sacrificial layer 504 (block 602). Generally, the first structural layer 502 comprises multiple layers including a structural or mechanical layer, such as a silicon-nitride ($Si_xN_y$) layer, having a thickness of from about 0.5 µm, to about 2 µm, and a conductive layer, such as a titanium-nitride (TiN) layer, having a thickness of from about 100 Å, to about 2 µm. The substrate 506 may include any known material used in MEMS fabrication including Silicon, Gallium-arsenide, Germanium, Gallium-nitride, Aluminum-phosphide, and mixtures or alloys thereof. The sacrificial layer 504 can include any suitable material that can be etched or removed with a high selectivity to the material of the substrate 506 and the first structural layer 502. In one embodiment, the sacrificial layer 504 can include a silicon-containing layer such as amorphous-silicon or polysilicon. Generally, the sacrificial layer has a thickness of about 5%/4 to enable sufficient movement of actuators formed from the first structural layer and to provide a sufficient margin against snap down. The first structural layer 502 and the conformal, sacrificial film 504 can be deposited, for example, by chemical vapor deposition (CVD) or plasma enhanced CVD (PECVD).

Figure 5B:
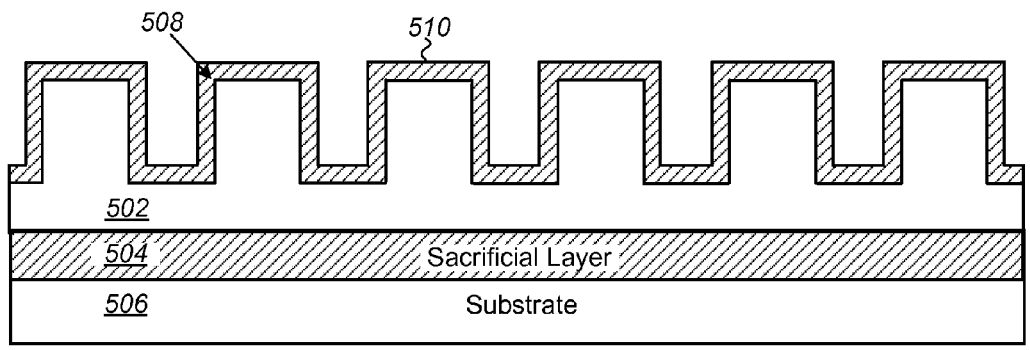

Referring to FIGS. 5B and 6, the first structural layer 502 is patterned using standard photolithographic and wet or dry etching techniques to form a number of actuators 508 therein (block 604). Next, a conformal, sacrificial film 510 is deposited by CVD or PDCVD (block 606). Generally, the sacrificial film 510 can have a thickness of from 100 to 500 Å. In one embodiment, the sacrificial film 510 is made from a material that can be etched or removed in the same process used to remove the sacrificial layer 504 to release the actuators.

Figure 5C:
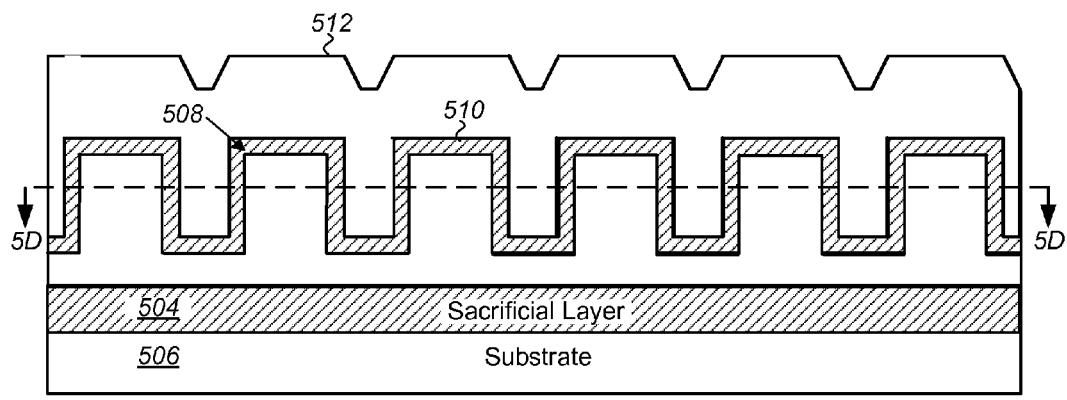

Referring to FIGS. 5C and 6, a non-conformal, second structural layer 512 is deposited over the sacrificial film 510 using CVD or PDCVD (block 608). Generally, as with the first structural layer 502 the second structural layer 512 comprises silicon-nitride and has a thickness of from about 0.5 µm, to about 2 µm.

Figure 5D:
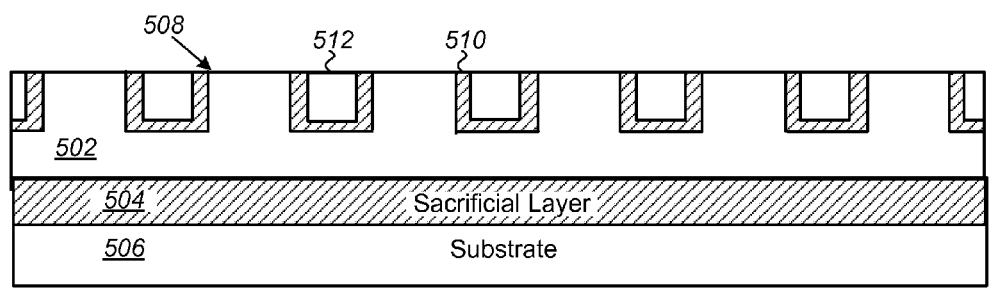

Referring to FIGS. 5D and 6, a surface of the second structural layer 512 is polished or planarized using chemical mechanical planarization or polishing (CMP) to expose at least a portion of the sacrificial film 510 and to form optically flat surfaces on the second structural layer 512 and on exposed surfaces of each of the plurality of actuators 508 (block 610).

Figure 5E:
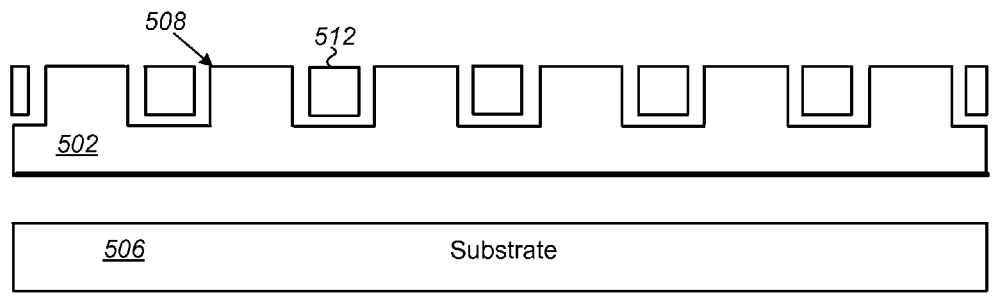

Finally, referring to FIGS. 5E and 6, the sacrificial layer 504 and sacrificial film 510 are etched or removed to release the actuators 508 (block 612). In one embodiment, wherein the sacrificial layer 504 and the sacrificial film 510 both comprise amorphous-silicon or polysilicon, the sacrificial layer and sacrificial film are removed in a dry etch step using Xenon difluoride ($XeF_2$). A suitable $XeF_2$ etch process involves sublimating the $XeF_2$ is in a container or vessel to a pressure of about 4 mTorr (the vapor pressure of $XeF_2$), and then introduced into a separate etch chamber in which the MEMS is positioned. Preferably, the $XeF_2$ release or etching process is performed in vapor phase at a pressure of 60 mTorr, at room temperature and with no external energy sources. Under these conditions, a highly selective and isotropic etch of the silicon-containing sacrificial layer has been observed with rates as high as 10 microns per minute.

A comparison of a diffractive MEMS fabricated according to a conventional method as compared to a diffractive MEMS fabricated according to an embodiment of the present invention will now be made with reference to FIGS. 7 and 8. FIG. 7 illustrates a top view of a portion of a diffractive MEMS 700 including four diffractor cells 702 fabricated according to a conventional method, and having a cell size or pitch (d) of 10 µm, a gap or separation (s) between an actuator 704 and faceplate 706 equal to minimum lithographic feature of 0.4 µm, a fill-factor of about 90%, and a scattering angle (θ) of 2° for an incident light having a wavelength (λ) of 355.

FIG. 8 is a top view of a diffractive MEMS 800 having a number of cells of fabricated according to a method of the present disclosure wherein the actuators, not the much smaller separation or gap, are limited by the minimum lithographic feature size. In particular, it is noted the MEMS 800 has a cell size or pitch (d) of 0.5 µm, a gap or separation (not shown) between the actuators 802 and the faceplate 804 of 200 Å, a scattering angle (θ) of 45° for an incident light having a wavelength (λ) of 355, and a fill-factor of about 90%. It will be appreciated that the separation between the actuators 802 and the faceplate 804 of 200 Å is determined by the thickness of a conformal sacrificial film used in fabricating the diffractive MEMS. It will further be appreciated that conformal sacrificial films significantly thinner than 200 Å can be used to provide smaller cell size or pitch and higher scattering angles, while maintaining a fill-factor of about 90% or more.

Another type of diffractive MEMS for which the disclosed method of fabrication is particularly useful is a ribbon-type diffractive MEMS, such as a grating light valve or GLV™ commercially available from Silicon Light Machines, Inc., of Sunnyvale, Calif.

Figure 9A:
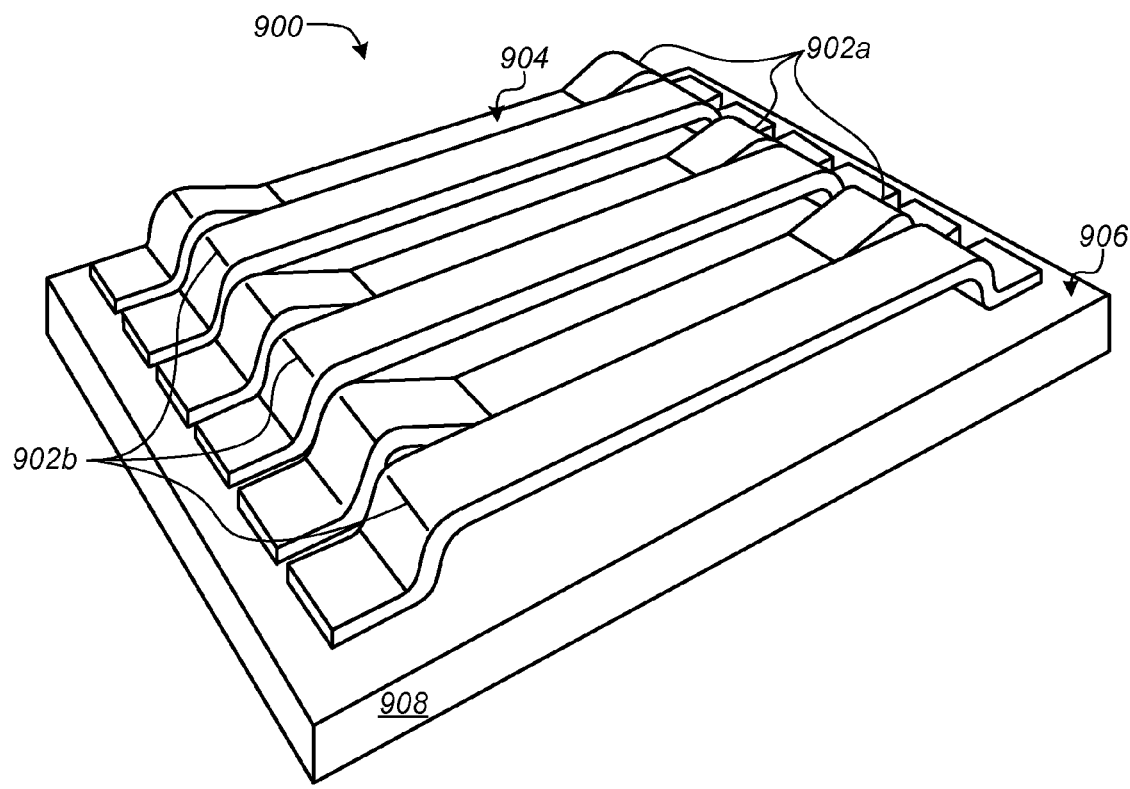
FIG. 9A is a perspective view of an embodiment of a ribbon-type diffractive MEMS fabricated according to a method of the present disclosure.

A perspective view of a pixel or sub-pixel of a ribbon-type diffractive MEMS 900 ribbons according to an embodiment of the present disclosure is shown in FIG. 9A. A schematic cross-sectional views of the pixel or sub-pixel of FIG. 9A according to two different embodiments are shown in a diffracting state is shown in FIG. 9B.

Referring to FIGS. 9A and B, a ribbon-type diffractive MEMS 900 generally includes a number of ribbons 902a, 902b, each having a light reflective surface 904 supported over a surface 906 of a substrate 908. One or more of the ribbons 902a are deflectable toward the substrate 908 to form an addressable diffraction grating with adjustable diffraction strength. The ribbons are 902a deflected towards drive electrodes 910 formed in or on the substrate 908 by electrostatic forces when a voltage is applied between actuator electrodes 912 in the deflectable ribbons 902a and the drive electrodes.

The applied voltages differential is controlled by drive electronics, which may be integrally formed in or on the surface 906 of the substrate 908 below or adjacent to the ribbons 902. Light reflected from the movable ribbons 902a adds as vectors of magnitude and phase with that reflected from stationary ribbons 902b or a reflective portion of the surface 906 beneath the ribbons, thereby modulating light reflected from the ribbon-type diffractive MEMS 900.

Figure 9B:
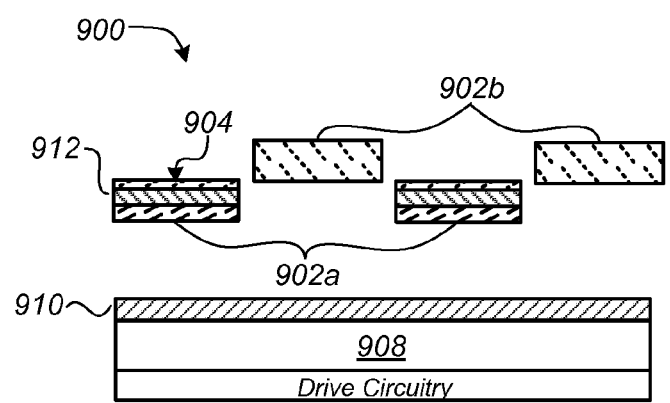
FIG. 9B is a schematic block diagram of a sectional side view of the ribbon-type diffractive MEMS of FIG. 9A.

FIG. 9B illustrates an embodiment of the ribbon-type diffractive MEMS 900 of FIG. 9A comprising both movable ribbons 902a and non-movable ribbons 902b in a diffracting state.

A method of fabricating ribbon-type diffractive MEMS 900 according to embodiments of the present invention will now be described in greater detail with reference to FIGS. 10A through 10E and 11. FIGS. 10A-10E are cross-sectional views through a substrate illustrating an embodiment of the fabrication process, and FIG. 11 is a flow chart of the method. For purposes of clarity, many of the details in the fabrication of MEMS in general, which are widely known and are not relevant to the present invention, have been omitted from the following description.

Figure 10A:
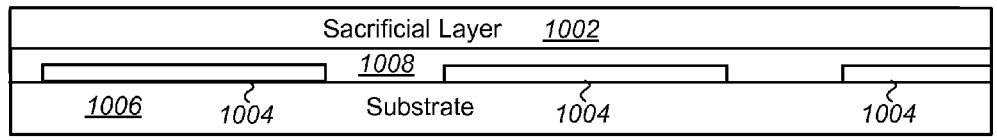
FIGS. 10A-10E are cross-sectional views through a substrate illustrating an embodiment of a fabrication process of a ribbon-type diffractive MEMS according to a method of the present disclosure.
Figure 11:
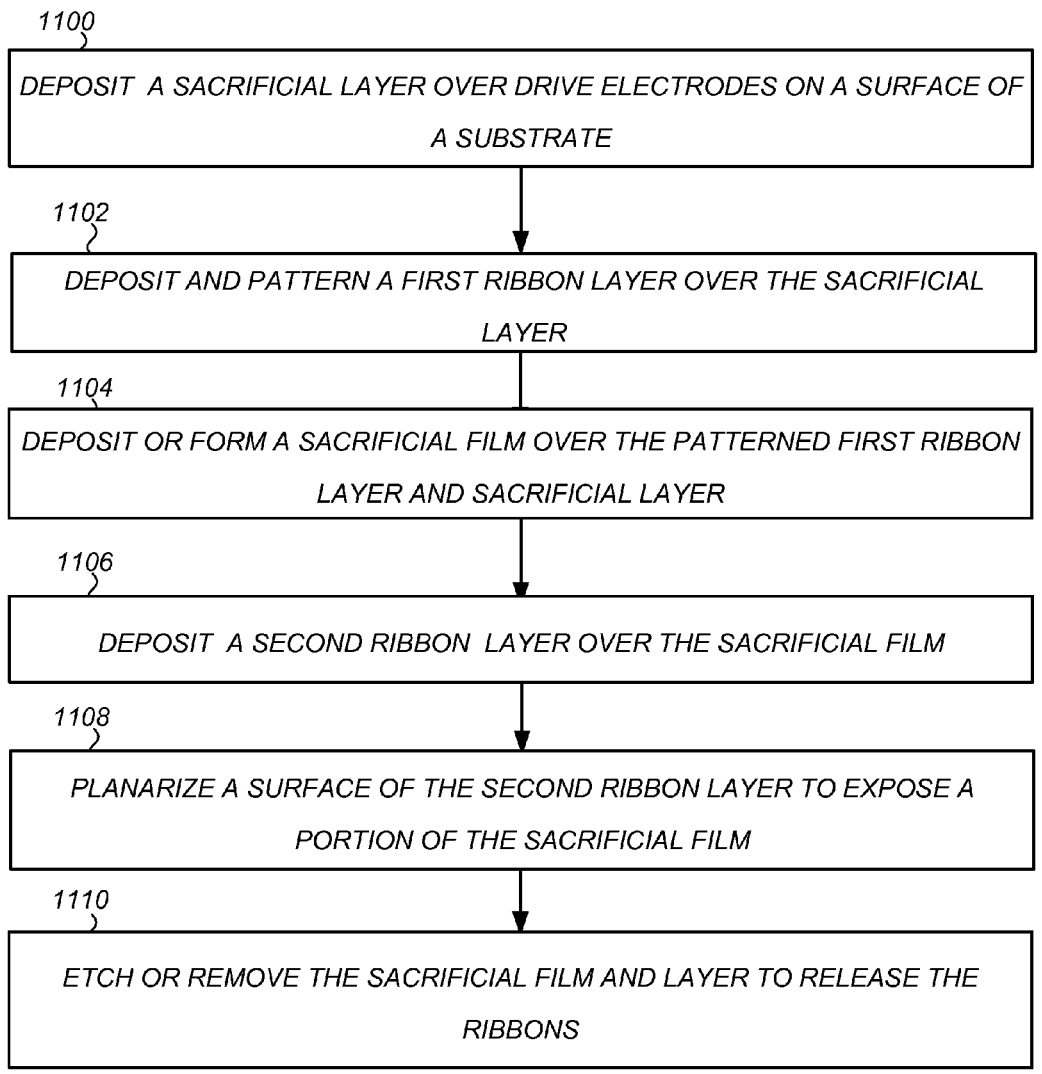
FIG. 11 is a flow chart illustrating an embodiment of a method for fabricating a ribbon-type diffractive MEMS according to the present disclosure.

Referring to FIGS. 10A and 11, the method of fabricating a sub-lithographic diffractive MEMS begins with depositing or forming a sacrificial layer 1002 over a number of drive electrodes 1004 formed on a surface of a substrate 1006 (block 1100). In some embodiments, such as that shown, the drive electrodes 1004 can be covered by a thin, planarized dielectric layer 1008, over which the sacrificial layer 1002 is deposited or formed.

Figure 10B:
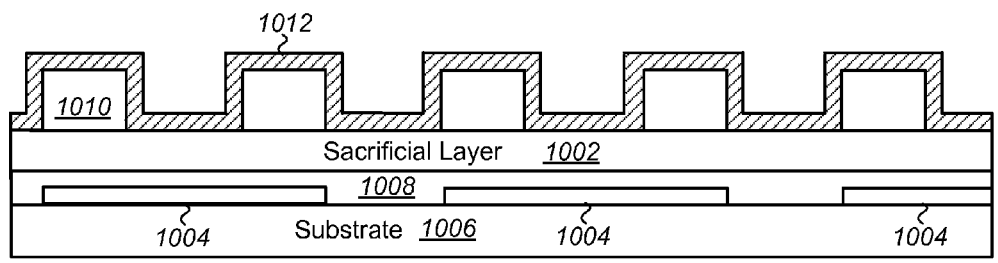

Referring to FIGS. 10B and 11, a first structural or ribbon layer 1010 is deposited over the sacrificial layer 1002 and patterned using standard photolithographic and wet or dry etching techniques to form a number of features therein (block 1102). Although not shown in this figure, the first ribbon layer 1010 generally comprises multiple layers as described above with respect to FIG. 9B, including a structural or mechanical layer, such as a silicon-nitride ($Si_xN_y$) layer, having a thickness of from about 0.5 µm, to about 2 µm, and a conductive layer, such as a titanium-nitride (TiN) layer, having a thickness of from about 0.5 µm, to about 2 µm. Next, a conformal, sacrificial film 1012 is deposited by CVD or PDCVD over the patterned first ribbon layer 1010 and exposed portions of the sacrificial layer 1002 (block 1104). As with the embodiment described above in connection with FIGS. 5A-5E, the sacrificial layer 1002 and sacrificial film 1010 can include any suitable material that can be etched or removed with a high selectivity to the material of the substrate 1004 and the ribbon layer 1012. In one embodiment, the sacrificial layer 1002 and sacrificial film 1010 can include a silicon-containing layer such as amorphous-silicon or polysilicon. Generally, the sacrificial layer has a thickness of about 5λ/4 to enable sufficient movement of actuators formed from the first structural layer and to provide a sufficient margin against snap down. The sacrificial film 1010 can have a thickness of from 100 to 500 Å. The sacrificial layer 1002 and the sacrificial film 1010 can be deposited, for example, by chemical vapor deposition (CVD) or plasma enhanced CVD (PECVD).

Figure 10C:
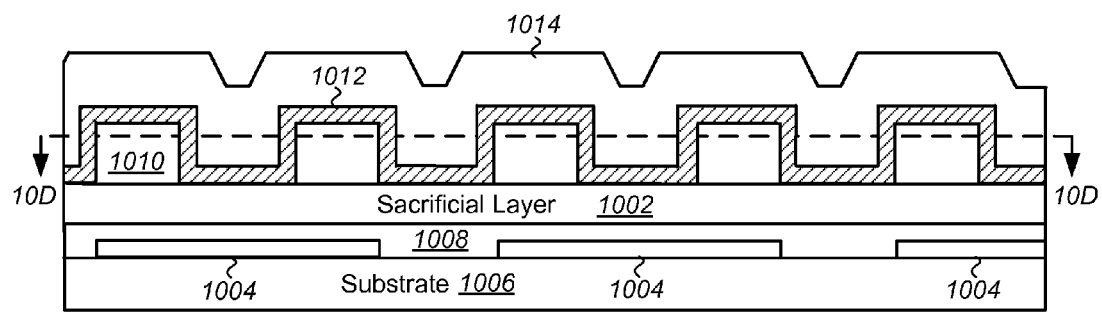
Figure 10D:
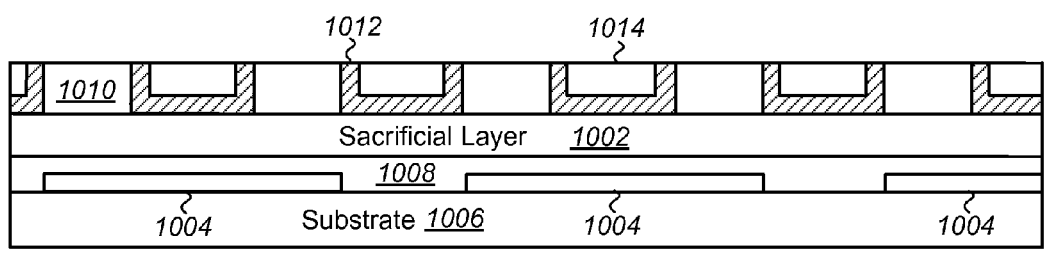

Referring to FIGS. 10C and 11, a second structural or ribbon layer 1014 is then formed or deposited over the sacrificial film 1012 (block 1106). Referring to FIGS. 10D and 11, a surface of the second ribbon layer 1014 is polished or planarized using chemical mechanical planarization or polishing (CMP) to expose at least a portion of the sacrificial film 1010 and to form optically flat surfaces on the first and second ribbon layers 1010 and 1014 (block 1108).

Figure 10E:
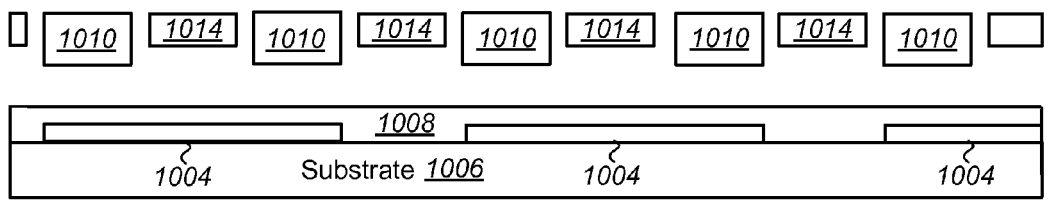

Finally, referring to FIGS. 10E and 11, the sacrificial layer 1002 and sacrificial film 1012 are etched or removed to release the movable ribbons, formed from the first ribbon layer 1010 and stationary static or bias ribbons, formed from the second ribbon layer 1014 (block 1110). In one embodiment, wherein the sacrificial layer 1002 and the sacrificial film 1012 both comprise amorphous-silicon or polysilicon, the sacrificial layer and sacrificial film are removed in a dry etch step using Xenon difluoride ($XeF_2$). A suitable $XeF_2$ etch process involves sublimating the $XeF_2$ is in a container or vessel to a pressure of about 4 mTorr (the vapor pressure of $XeF_2$), and then introduced into a separate etch chamber in which the MEMS is positioned. Preferably, the $XeF_2$ release or etching process is performed in vapor phase at a pressure of 60 mTorr, at room temperature and with no external energy sources. Under these conditions, a highly selective and isotropic etch of the silicon-containing sacrificial layer has been observed with rates as high as 10 microns per minute.

In the preceding description, for purposes of explanation, numerous specific details have been set forth in order to provide a thorough understanding of the fabrication method of the present disclosure. It will be evident; however, to one skilled in the art that the present method may be practiced to form MEMS devices without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the diffractive MEMS. The appearances of the phrase "one embodiment" in various places in the specification do not necessarily all refer to the same embodiment. The term "to couple" as used herein may include both to directly connect and to indirectly connect through one or more intervening components.

The foregoing description of specific embodiments and examples have been presented for the purpose of illustration and description, and although described and illustrated by certain of the preceding examples, the diffractive MEMS disclosed herein are not to be construed as being limited thereby. They are not intended to be exhaustive or to limit the method to the precise forms disclosed, and many modifications, improvements and variations within the scope of the disclosure are possible in light of the above teaching.

What is claimed is:

1. A method of fabricating a diffractive MicroElectroMechanical system (MEMS) comprising:
   depositing a sacrificial layer onto a substrate;
   depositing a first structural layer on the sacrificial layer and patterning the structural layer to form a patterned structural layer including plurality of actuators;
   conformably depositing a sacrificial film on the patterned structural layer;
   depositing a second structural layer on the sacrificial film;
   planarizing the second structural layer to expose the sacrificial film and the plurality of actuators; and
   removing the sacrificial layer and sacrificial film to release the plurality of actuators, each of the plurality of actuators separated from the second structural layer by a thickness of the conformal sacrificial film.

2. A method according to claim 1, wherein conformably depositing a sacrificial film comprises conformably depositing a film having a thickness of from 100 to 2000 Å.

3. A method according to claim 1, wherein patterning the structural layer comprises forming a plurality of actuators having a dimension parallel to a plane of the structural layer of less than or equal to 500 μm.

4. A method according to claim 3, wherein patterning the structural layer comprises forming a plurality of actuators separated from one another by less than or equal to 500 μm.

5. A method according to claim 1, wherein planarizing the second structural layer comprises chemical-mechanical-polishing (CMP) to form optically flat surfaces on the second structural layer and on exposed surfaces of each of the plurality of actuators.

6. A method according to claim 5, comprising the further step of depositing a reflective material over the optically flat surfaces on the second structural layer and on each of the plurality of actuators.

7. A method according to claim 6, wherein the optically flat surfaces on the second structural layer and on each of the plurality of actuators comprise an area with substantially equal reflectivity.

8. A method according to claim 1, further comprising forming a plurality of posts extending through the sacrificial layer to the substrate prior to depositing the first structural layer, and wherein patterning the structural layer comprises forming a plurality of flexures coupling the plurality of actuators to a number of the plurality of posts.

9. A method according to claim 1, wherein the sacrificial layer and sacrificial film comprise amorphous-silicon or polysilicon.

10. A method according to claim 9, wherein removing the sacrificial layer and sacrificial film comprises removing the sacrificial layer and sacrificial film in a dry etch step using Xenon difluoride ($XeF_2$).

11. An intermediate MicroElectroMechanical system (MEMS) structure comprising:
    a sacrificial layer on a substrate;
    a patterned structural layer including plurality of actuators on the sacrificial layer;
    a conformal sacrificial film on the patterned structural layer; and
    a second structural layer on the sacrificial film,
    wherein each of the plurality of actuators is separated from the second structural layer by a thickness of the conformal sacrificial film that is less than a sub-lithographic gap, and
    wherein reflective surfaces formed on the plurality of actuators are co-planar with reflective surfaces formed on the second structural layer when the MEMS structure is in a quiescent state, and the reflective surfaces formed on the plurality of actuators are laterally separated from the reflective surfaces formed on the second structural layer by a distance of from 100 to 2000 Å.

12. An intermediate MEMS structure according to claim 11, wherein the conformal sacrificial film comprises a thickness of from 100 to 2000 Å.

13. An intermediate MEMS structure according to claim 11, wherein the plurality of actuators have a dimension parallel to a plane of the structural layer of less than or equal to 500 μm.

14. An intermediate MEMS structure according to claim 13, wherein the patterned structural layer comprises a plurality of actuators separated from one another by less than or equal to 500 μm.

15. An intermediate MEMS structure according to claim 11, further comprising a plurality of posts extending through the sacrificial layer to the substrate, and wherein the patterned structural layer comprises a plurality of flexures coupling the plurality of actuators to a number of the plurality of posts.

16. An intermediate MEMS structure according to claim 11, wherein the patterned structural layer comprises a plurality of actuators separated from one another by a pitch of 0.25 to 2 μm.

17. An intermediate MEMS structure according to claim 11, wherein the patterned structural layer comprises a plurality of cylinders.

18. A method of fabricating a diffractive MicroElectroMechanical system (MEMS) comprising:
    depositing a sacrificial layer onto a substrate;
    depositing a first structural layer on the sacrificial layer and patterning the structural layer to form a patterned structural layer including plurality of actuators;
    conformably depositing a sacrificial film on the patterned structural layer;
    depositing a second structural layer on the sacrificial film;
    planarizing the second structural layer to expose at least a portion of the sacrificial film and a portion of each of the plurality of actuators; and
    removing the sacrificial layer and sacrificial film to release the plurality of actuators, each of the plurality of actuators separated from the second structural layer by a thickness of the conformal sacrificial film.

19. A method according to claim 18, wherein planarizing the second structural layer further comprises planarizing the exposed portion of each of the plurality of actuators.

* * * * *